(12) United States Patent
Zinsmeister et al.

(10) Patent No.: US 6,661,385 B2
(45) Date of Patent: Dec. 9, 2003

(54) COVER FOR A SLIDING ROOF

(75) Inventors: Arnulf Zinsmeister, Mömbris (DE); Joachim Röder, Mühlheim (DE); Kai Stehning, Usingen (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/091,681

(22) Filed: Mar. 5, 2002

(65) Prior Publication Data
US 2002/0126056 A1 Sep. 12, 2002

(30) Foreign Application Priority Data
Mar. 7, 2001 (DE) .................. 101 10 848

(51) Int. Cl.[7] .................. H01Q 1/32
(52) U.S. Cl. .................. 343/713; 343/711
(58) Field of Search .................. 343/713, 711; 296/216.09

(56) References Cited
U.S. PATENT DOCUMENTS
4,758,166 A * 7/1988 Bonnett et al. .......... 343/712
6,375,254 B1 * 4/2002 Patz .................. 296/216.09

FOREIGN PATENT DOCUMENTS

| DE | 33 34 760 | 4/1985 | ........... H01Q/1/32 |
| DE | 38 02 130 | 8/1989 | ........... H01Q/21/24 |
| DE | 196 53 431 | 7/1997 | ........... B60R/13/02 |
| DE | 196 37 794 A1 | 3/1998 | ........... B60J/7/04 |
| DE | 196 37 794 | 3/1998 | ........... B60J/7/04 |

OTHER PUBLICATIONS

"Integral Roof Antenna Improves Vehicle Design" Machine Design, Penton, Inc. Cleveland, OH Feb. 20, 1992.

German Search Report for DE 101 10 848.6 dated Nov. 16, 2001.

* cited by examiner

Primary Examiner—Hoang V. Nguyen
(74) Attorney, Agent, or Firm—Carlson, Gaskey & Olds

(57) ABSTRACT

A cover for a sliding roof comprises a cover plate of a non-metallic material, for example of glass, and also a frame, which is arranged on the cover plate, and an antenna. The antenna is arranged in the frame.

20 Claims, 2 Drawing Sheets

COVER FOR A SLIDING ROOF

BACKGROUND OF THE INVENTION

The invention relates to a cover for a sliding roof, which comprises a cover plate of a non-metallic material, for example of glass, and also a frame which is attached to the cover plate, and an antenna.

The cover of the sliding roof is used to partially or completely expose a roof opening in the roof of motor vehicles. The cover plate can consist of glass or of a high-strength plastic, so that even when the cover is closed, it is possible for light to pass through.

Published German Patent Application DE 196 37 794 A1 shows a cover plate which consists of a laminated glass, an antenna being arranged between two layers of the laminated glass. Providing the antenna on a cover which does not consist of metal is advantageous, because the cover does not screen the antenna. If namely the antenna were arranged at a different site on the vehicle roof, the antenna would be screened by the metallic outer skin of the roof such that the transmitting/receiving power of the antenna is insufficient. A disadvantage in the known cover construction, however, is the high constructional expenditure.

SUMMARY OF THE INVENTION

The object of the invention therefore consists in further developing a cover for a sliding roof of the type initially mentioned in that an antenna can be arranged with a small amount of expenditure.

According to the invention, a cover is provided which comprises a cover plate of a non-metallic material, for example of glass, and also a frame, which is arranged on the cover plate, and an antenna. The antenna is arranged in the frame. The frame offers a variety of possibilities for arranging the antenna in a favorably-priced manner, for example directly embedded in the frame by means of a foam casing. A further advantage of the construction according to the invention consists in that it is not necessary to use laminated glass panels in order to arrange the antenna.

According to a preferred embodiment of the invention, provision is made that the antenna is formed by a reinforcement insert in the frame. Thus, elements of the reinforcement insert which are present in any case are used for the antenna, several individual pieces of the reinforcement insert being able to be connected together in a suitable manner.

Advantageous embodiments of the invention will be apparent from the subclaims.

DETAILED DESCRIPTION OF THE INVENTION

Figure 1:
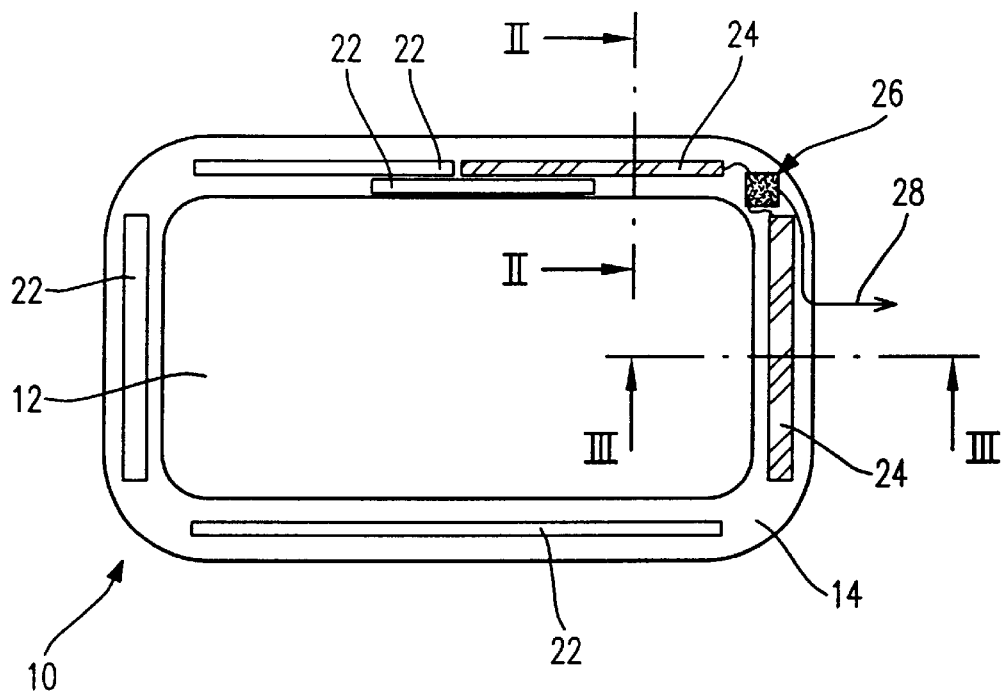
FIG. 1 shows a schematic top view onto a cover according to the invention.
Figure 2:
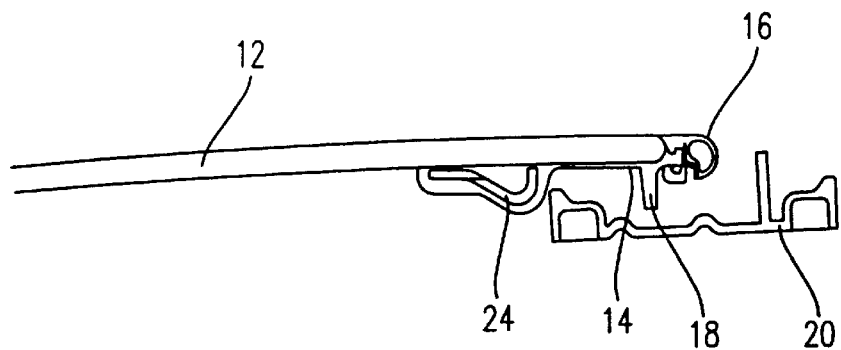
FIG. 2 shows a schematic sectional view along the plan II—II of FIG. 1.
Figure 3:
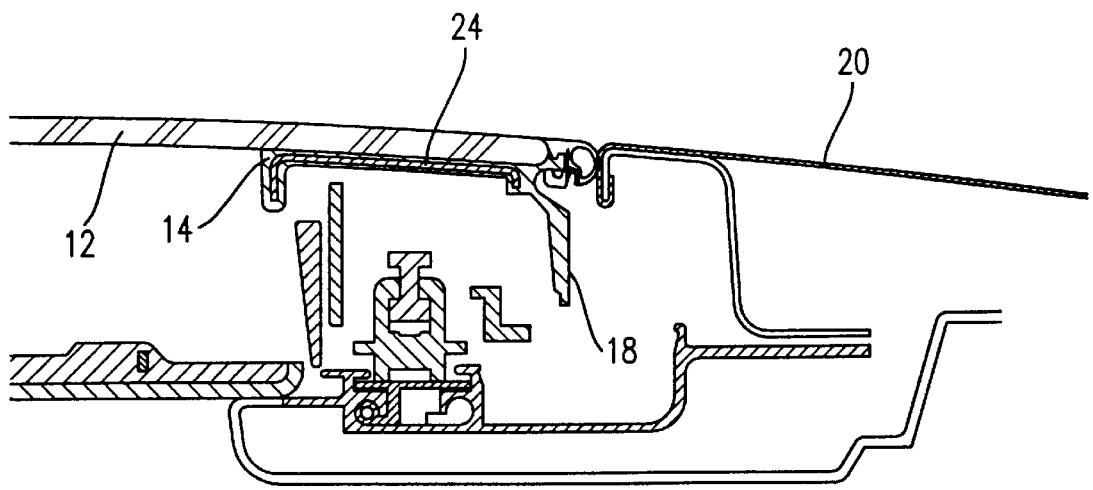
FIG. 3 shows a schematic sectional view along the plane III—III of FIG. 1, some parts of the sliding roof and of the vehicle roof being additionally shown.

FIG. 1 a cover 10 is shown, which comprises a cover plate 12 and a frame 14. The cover plate 12 consists of glass or of a suitable high-strength plastics material. The frame 14 (see also FIGS. 2 and 3) usually consists of an invention-molded or foamed plastics material and is arranged so as to extend around the entire cover plate. It has a marginal gap seal 16 and functional structures 18 which are not important for an understanding of the invention. The cover is arranged in a known manner so as to be displaceable on a vehicle roof 20, which is indicated here schematically.

In the frame, several reinforcement inserts 22, 24 are arranged. They serve to give the frame and the cover plate connected therewith the necessary stability. Of the reinforcement inserts 22, 24, at least the reinforcement inserts 24 consist of an electrically conductive material, so that they can be used as an antenna. For this purpose, an electric circuit 26 cast into the frame for connecting the antenna, and also a connection cable 28 are provided. As can be seen in FIG. 1, two reinforcement inserts 24, which are arranged at right-angles to each other, are connected together to form the antenna. It would also be possible to connect together two reinforcement inserts arranged in longitudinal direction one behind the other. In this way, the length of the antenna can be coordinated with the respective transmitting/receiving conditions.

Figure 4:
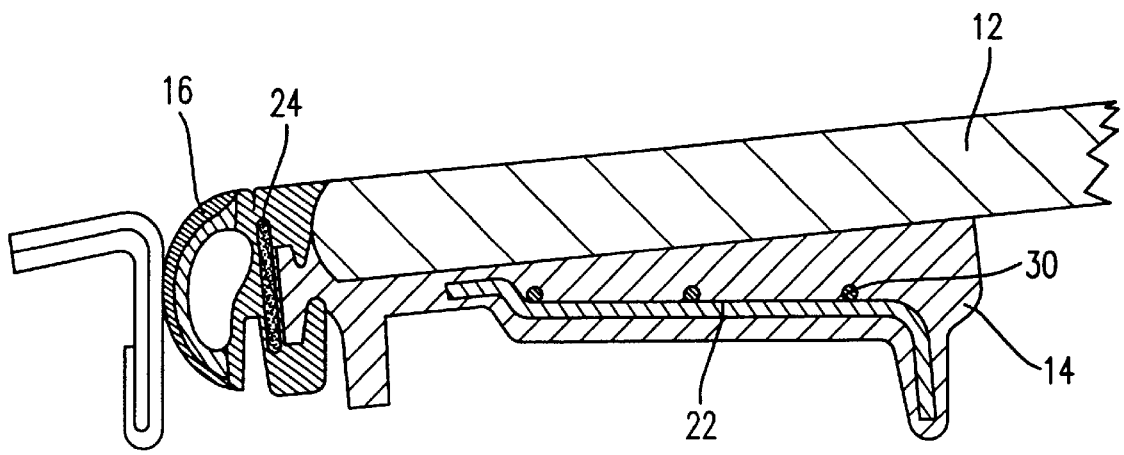
FIG. 4 shows in an enlarged sectional view a cover according to a second embodiment of the invention.

In FIG. 4 a further embodiment is shown, in which the antenna is formed by a separately constructed antenna wire 30 which is cast on the reinforcement insert 22 into the frame 14. In addition, a reinforcement insert 24, serving as antenna, can be seen, which is constructed here as a framework band of the marginal gap seal 16 of the frame 14.

In the embodiments shown, an antenna can be provided which is constructed and arranged in a protected manner with a small amount of expenditure, and which is suitable in particular for systems in which the efficiency output does not have to be optimised, for example garage door openers, radio controlled central locking systems or the like.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A cover for a sliding roof comprising:

a cover plate of a non-metallic material;

a frame attacked to said cover plate; and a reinforcement insert arranged in said frame, wherein the reinforcement insert acts as an antenna.

2. The cover according to claim 1, wherein a plurality of said reinforcement inserts are connected together to form said antenna.

3. The cover according to claim 2, wherein in said frame an electric circuit is arranged in said frame for connecting said plurality of reinforcement inserts together.

4. The cover according to claim 1, wherein said cover consists of glass.

5. The cover according to claim 1, wherein said cover consists of a plastics material.

6. The cover according to claim 1, wherein said reinforcements insert is cast into said frame.

7. A cover for a sliding roof comprising:
a cover plate of a non-metallic material;
a frame attached to said cover plate; a reinforcement insert which is cast into said frame; and
an antenna arranged on the reinforcement insert.

8. The cover according to claim 7, wherein said cover comprises glass.

9. The cover according to claim 7, wherein said cover comprises a plastics material.

10. A cover for a sliding roof comprising:
a cover plate of a non-metallic material;
a frame attached to said cover plate; and
an antenna arranged in said frame, wherein said frame has a marginal gap seal and said antenna is formed by a framework band of said marginal gap seal.

11. A vehicle roof component comprising:
a vehicle roof having an opening;
a cover for a sliding roof, the cover having
a cover plate of a non-metallic material;
a frame attached to said cover plate; and
a reinforcement insert arranged in said frame, wherein the reinforcement insert acts as an antenna.

12. The vehicle roof component according to claim 11, wherein a plurality of said reinforcement inserts are connected together to form said antenna.

13. The vehicle roof component according to claim 12, wherein in said frame an electric circuit is arranged for connecting said plurality of reinforcement inserts together.

14. The vehicle roof component according to claim 11, wherein said cover comprises glass.

15. The vehicle roof component according to claim 11, wherein said cover consists of a plastics material.

16. The vehicle roof component according to claim 11, wherein said reinforcements insert is cast tine said frame.

17. A vehicle roof component comprising:
a vehicle roof having an opening;
a cover for a sliding roof, the cover having
a cover plate of a non-metallic material;
a frame attached to said cover plate; a reinforcement insert which is cast into said frame; and
an antenna arranged on the reinforcement insert.

18. The vehicle roof component according to claim 17, wherein said cover comprises glass.

19. The vehicle roof component according to claim 17, wherein said cover comprises a plastics material.

20. A vehicle roof component, comprising:
a vehicle roof having an opening;
a cover for a sliding roof, the cover having
a cover plate of a non-metallic material;
a frame attached to said cover plate; and
an antenna arranged in said frame, wherein said frame has a marginal gap seal and said antenna is formed by a framework band of said marginal gap seal.

* * * * *

UNITED STATES PATENT AND TRADEMARK OFFICE
CERTIFICATE OF CORRECTION

PATENT NO. : 6,661,385 B2
DATED : December 9, 2003
INVENTOR(S) : Zinsmeister et al.

It is certified that error appears in the above-identified patent and that said Letters Patent is hereby corrected as shown below:

Column 2,
Line 57, please delete "in said frame" after "wherein" and before "an"
Line 65, "reinforcements" should read -- reinforcement --

Column 4,
Line 6, "tine" should read -- into --

Signed and Sealed this

Third Day of February, 2004

JON W. DUDAS
*Acting Director of the United States Patent and Trademark Office*